Patented Dec. 29, 1936

2,065,518

UNITED STATES PATENT OFFICE 2,065,518

METHOD OF MAKING YARNS, FILAMENTS, AND THE LIKE AND PRODUCT THEREOF

Camille Dreyfus, New York, N. Y., and William Whitehead, Cumberland, Md., assignors to Celanese Corporation of America, a corporation of Delaware No Drawing. Application April 17, 1930, Serial No. 445,203

9 Claims. (Cl. 18—54)

This invention relates to the manufacture of articles such as yarns, filaments, films, etc. from solutions or plastic masses containing organic derivatives of cellulose such as cellulose acetate. This invention is a continuation-in-part of the invention described in application S. No. 318,583 filed November 10, 1928, which issued on May 8, 1934 as Patent No. 1,958,238.

An object of our invention is to render solutions or plastic masses to be employed for making articles more fluid by the addition thereto of a free fatty acid.

A further object of our invention is to produce artificial yarns or filaments of organic derivatives of cellulose of fine dimensions and which are more pliable than those heretofore made. Other objects of our invention will appear from the following detailed description.

In the manufacture of filaments, yarns, films, etc. from derivatives of cellulose, the derivatives of cellulose are dissolved in a suitable solvent to form a solution of desired concentration. In all cases, the solution thus formed is more or less viscous. For ease of handling of such solutions, it is desirable that for a given concentration they should have minimum viscosity.

We have found that if a relatively small amount of a free higher fatty acid of the aliphatic series, which is soluble in the solvents employed, is incorporated in solutions or plastic masses containing organic derivatives of cellulose, the viscosity of the same is materially reduced. This reduction of viscosity facilitates the filtering, conveying and working of such solutions and plastic masses. Moreover yarns or filaments of finer size and greater pliability may be formed from such solutions containing the fatty acid. This reduction of viscosity is probably due to the fact that these higher fatty acids act as electrolytes, when dissolved in such solvents as acetone or other liquids employed as solvents for derivatives of cellulose.

In accordance with our invention, we prepare solutions or plastic masses of reduced viscosity by dissolving an organic derivative of cellulose in a suitable solvent or solvent mixture, while incorporating a suitable proportion of a higher fatty acid that is soluble in the solvent or solvent mixture. The solutions or plastic masses thus formed may be used as such, or may be formed into articles such as filaments, yarns, photographic films and various articles.

Any suitable organic derivative of cellulose may be employed such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

The organic derivative of cellulose is dissolved in a suitable solvent or solvent mixture such as acetone, mixtures of ethylene dichloride and ethyl or methyl alcohol, mixtures of methylene chloride and ethyl or methyl alcohol, mixtures of dichlorethylene and ethyl or methyl alcohol, depending upon the solubility characteristic of the organic derivative of cellulose employed. If desired, other and higher boiling solvents such as ethyl lactate, diacetone alcohol, etc. may also be added to this solution, and in some cases plasticizers such as dibutyl tartrate or diethyl phthalate may be added thereto.

As stated, in order to reduce the viscosity of the solution of the derivative of cellulose and to impart other desirable properties to the products formed therefrom, a suitable proportion of a higher fatty acid soluble in the solvent employed is incorporated therein. Examples of such higher fatty acids are oleic acid and the free fatty acids obtained from cocoanut oil, but any other fatty acid may be employed provided it is of high boiling point and low volatility and is soluble in the solvent used. The proportion of the free fatty acid added to or incorporated in the solution of the derivative of cellulose may vary from 0.3 to 10% or more of the weight of the organic derivative of cellulose present, and the choice of the amount employed will depend on the various desired physical properties of the resulting product.

By the addition of the higher fatty acid to the solution in the manner described, the viscosity of the solution formed is reduced considerably. Because of this reduction in viscosity, the solutions may be filtered more readily and economically and when extruded through fine orifices in the spinning of yarn, do not tend to clog such orifices. Moreover pipes of smaller diameter may be employed for conveying such solutions because of their reduced viscosity. Furthermore by employing the free fatty acids in the manner described, more concentrated solutions of derivatives of cellulose may be made having the same viscosity as solutions containing smaller amounts of derivatives of cellulose and no free fatty acid.

This invention lends itself to many applications. Thus in the making of lacquers, dopes, varnishes, etc. containing the organic derivative of cellulose and the other constituents normally employed as volatile, medium and high boiling solvents, plasticizers, resins and pigments, by the addition of the small amount of the higher fatty acid, the viscosity is reduced. This reduction in viscosity renders the application of such lacquers by brushing or spraying much easier, and permits, if desired, the use of a lacquer containing much larger amounts of derivatives of cellulose.

If solutions containing organic derivatives of cellulose and the higher fatty acid are extruded through orifices of a spinneret into a drying atmosphere or into a precipitating bath, many advantages result. Filaments of much finer denier than heretofore have been possible may be made.

Yarns or filaments made from solutions containing the higher fatty acids delustre more readily in hot water or aqueous solutions than yarns made from solutions not containing the fatty acid. Yarns made from solutions containing as little as 2% of the fatty acid based on the weight of the organic derivative of cellulose have the property of delustering in scouring baths, and more particularly in scouring baths containing soaps or other emulsifying agents for the fatty acids, at the temperatures normally employed for scouring, say 65° C. Moreover yarns or artificial bristles or straw made in accordance with this invention have greater pliability as shown by the fact that yarns may be knitted more closely, whilst the bristles and straw may be bent more severely.

Other ingredients may be added to the spinning solutions containing the organic derivative of cellulose and the fatty acid so that yarns may be made therefrom, which yarns have even more improved workability. For instance, polyhydric alcohols such as glycerol, diglycerol, glycols and diglycols and esters or ethers of these may be added. In order further to illustrate our invention, but without being limited thereto, the following specific examples are given.

*Example I*

1 part by weight of an acetone soluble cellulose acetate containing between 54 and 55% combined acetic acid, is dissolved in 3 parts by weight of a solvent mixture consisting of 95% acetone and 5% of water. The whole is mixed to a homogeneous mass and then free cocoanut fatty acids in amounts equal to 5% of the weight of the cellulose acetate present are added and mixed in thoroughly.

The charge is then filtered and spun by extruding through orifices of a spinneret into an evaporative atmosphere and the filaments thus formed are drawn by a feed roller to a suitable winding and/or winding and twisting device. By reducing the rate of feed of the spinning solution to the spinneret or by increasing the winding speed of the feed roller, or by both of these expedients, fine filaments may be formed which have a size of 75% of that of the size of the finest filaments that can be drawn out from a solution of cellulose acetate that does not contain the cocoanut fatty acids. Moreover the viscosity of the spinning solution is materially reduced to the order of about 70 to 80% of the viscosity of a solution not containing the cocoanut fatty acids and the resistance to flow through pipe lines, presses, filters, etc. is materially reduced.

Yarn produced as above is materially more pliable than yarn produced from solutions not containing the cocoanut fatty acid, and may be knitted with closer stitches, twisted to higher twists and otherwise subjected to more severe textile treatments. Moreover such yarns or fabrics made therefrom delustre and become opaque in scouring or dye baths at temperatures normally employed such as for example 65° C. to 75° C.

If instead of employing cocoanut fatty acids in amounts of 5%, only 2% based on the weight of the cellulose acetate is used, the result in respect to fluidity, fineness of filament obtainable and lowered resistance to flow through filtered presses is materially the same. The yarns thus formed, however, do not display the ability to delustre and scour in dye baths at temperatures substantially below 100° C.

If the cocoanut fatty acid is employed in amounts equal to 10% of the weight of the cellulose acetate, similar results are obtained as in the case where only 5% of the weight of the cellulose acetate is employed. However the pliability of the yarn is more marked than in the case where only 5% is employed, as is its ability to delustre in dyeing or scouring baths.

*Example II*

The processes of Example I are carried out employing oleic acid instead of the free cocoanut fatty acids of Example I. Similar results are obtained.

It is to be understood that the foregoing examples are given merely by way of illustration, and that many variations may be made therein without departing from the spirit of our invention.

Having described our invention, what we deside to secure by Letters Patent is:

1. In a method of manufacturing articles containing acetone-soluble organic derivatives of cellulose by processes involving the formation of a solution of an organic derivative of cellulose in a solvent mixture containing acetone, the steps of incorporating in said solution in amount equal to 0.3 to 10% of the weight of the organic derivative of cellulose present a higher fatty acid soluble in said solvent mixture, said fatty acid being the only acid reacting substance present in the solution, and forming the solution into said articles.

2. In a method of manufacturing filaments or films containing acetone-soluble cellulose acetate by processes involving the formation of a solution of cellulose acetate in a solvent mixture containing acetone, the steps of incorporating in said solution in amount equal to 0.3 to 10% of the weight of cellulose acetate present a free fatty acid derived from cocoanut oil, said fatty acid being the only acid reacting substance present in the solution and forming said articles by extrusion of the solution into a coagulating medium.

3. In a method of manufacturing artificial filaments of low lustre containing acetone-soluble cellulose acetate by processes involving the formation of a solution of cellulose acetate in a solvent mixture containing acetone, the steps of incorporating in said solution in amount equal to 0.3 to 10% of the weight of cellulose acetate present a higher fatty acid soluble in said solvent mixture, said fatty acid being the only acid reacting substance present in the solution, forming said filaments by extruding the solution into a coagulating medium and subjecting the products while said acid is substantially retained therein to the action of a hot aqueous liquid.

4. In a method of manufacturing artificial filaments of low lustre containing acetone-soluble cellulose acetate by processes involving the formation of a solution of cellulose acetate in a solvent mixture containing acetone, the steps of incorporating in said solution in amount equal to 0.3 to 10% of the weight of cellulose acetate present a free fatty acid derived from cocoanut oil, said fatty acid being the only acid reacting substance present in the solution, forming said filaments by extruding a solution into a coagulating medium and subjecting the products while said acid is substantially retained therein to the action of a hot aqueous liquid maintained at a temperature below that required to deluster acetone soluble cellulose acetate yarn free from such fatty acid.

5. Yarn containing an acetone-soluble organic derivative of cellulose and from 0.3 to 10% of a higher fatty acid calculated on the weight of the organic derivative of cellulose, said fatty acid being soluble in the solution from which the yarn was formed.

6. Yarn containing acetone-soluble cellulose acetate and from 0.3 to 10% of a higher fatty acid calculated on the weight of the cellulose acetate, said fatty acid being soluble in the solution from which the yarn was formed.

7. Yarns containing an acetone-soluble organic derivative of cellulose and from 0.3 to 10% of free fatty acids derived from cocoanut oil calculated on the weight of the organic derivative of cellulose, said fatty acid being soluble in the solution from which the yarn was formed.

8. Yarns containing acetone-soluble cellulose acetate and from 0.3 to 10% of free fatty acids derived from cocoanut oil calculated on the weight of the cellulose acetate, said fatty acid being soluble in the solution from which the yarn was formed.

9. Method of producing low lustre yarns, which comprises forming a solution in a solvent mixture containing acetone of acetone-soluble cellulose acetate and free fatty acids derived from cocoanut oil, spinning the solution so that the said acids are substantially retained in the products, and subjecting the products to the action of a hot aqueous liquid.

CAMILLE DREYFUS.
WILLIAM WHITEHEAD.